United States Patent
Cronin et al.

(10) Patent No.: US 10,384,883 B2
(45) Date of Patent: Aug. 20, 2019

(54) CARD REORIENTING MECHANISM AND METHODS UTILIZING SAME

(71) Applicant: DATACARD CORPORATION, Minnetonka, MN (US)

(72) Inventors: Patrick C. Cronin, Savage, MN (US); Mark J. Sobania, Ham Lake, MN (US); Arthur J. Paulson, Minneapolis, MN (US); Rajesh Kalachand Juriasingani, Chaska, MN (US)

(73) Assignee: Entrust Datacard Corporation, Shakopee, MN (US)

( * ) Notice: Subject to any disclaimer, the term of this patent is extended or adjusted under 35 U.S.C. 154(b) by 783 days.

(21) Appl. No.: 13/773,753

(22) Filed: Feb. 22, 2013

(65) Prior Publication Data

US 2013/0220984 A1 Aug. 29, 2013

Related U.S. Application Data

(60) Provisional application No. 61/602,321, filed on Feb. 23, 2012.

(51) Int. Cl.
*B65G 47/24* (2006.01)
*B65H 15/00* (2006.01)

(52) U.S. Cl.
CPC .............. *B65G 47/24* (2013.01); *B65H 15/00* (2013.01); *B65H 2301/33214* (2013.01); *B65H 2301/442* (2013.01); *B65H 2701/1914* (2013.01)

(58) Field of Classification Search
CPC .................... B65G 47/24; B65H 15/00; B65H 2301/33214; B65H 2301/442;

(Continued)

(56) References Cited

U.S. PATENT DOCUMENTS 2,968,480 A * 1/1961 Knefel ................... G06K 13/08
271/162
3,223,409 A * 12/1965 Eissfeld ................. B65H 29/66
270/59

(Continued)

FOREIGN PATENT DOCUMENTS

JP      02244393 A * 9/1990
JP      07-271922    10/1995

OTHER PUBLICATIONS

International Search Report for international application No. PCT/US2013/027253, dated May 27, 2013 (4 pages).

(Continued)

*Primary Examiner* — Dana Ross
*Assistant Examiner* — Ket D Dang
(74) *Attorney, Agent, or Firm* — Hamre, Schumann, Mueller & Larson, P.C.

(57) ABSTRACT

Systems and methods that utilize a card reorienting mechanism are described. Generally, the card reorienting mechanism can transport and rotate a card without substantially contacting one of the principal surfaces of the card. The use of the card reorienting mechanism permits reorienting of the card without substantially contacting the principal surface of the card after the operation has been performed on the principal surface of the card. The card reorienting mechanism of the present disclosure can be useful where rotation of the card without contacting the principal surfaces of the card is desired moments after ink is applied to one of the principal surfaces of the card. In addition, substantially the entire principle surface is accessible for processing operations while the card is on the reorienting mechanism, such as for laser personalization or for image capture.

9 Claims, 8 Drawing Sheets

(58) Field of Classification Search
CPC . B65H 2701/1914; G07F 7/1008; G07F 7/08; G07F 7/02; G06Q 20/341; G06Q 20/40; G06Q 20/04
USPC ........ 209/3.3, 538, 541, 545, 583, 587, 534; 219/121.82, 121.85, 159, 162, 244; 198/379, 339, 300, 319, 338, 341.05, 198/345.2, 345.3, 370.09, 370.1, 373, 198/450, 470.1; 271/185, 186, 65, 165, 271/166; 700/65, 1, 66, 17, 83; 348/207, 348/143, 231, 333.05, 373; 250/201.2, 250/201.5, 234, 235; 194/206, 207; 382/135, 137–140; 235/379, 380, 375, 235/449, 381; 400/601; 156/64, 277, 156/349
See application file for complete search history.

(56) References Cited

U.S. PATENT DOCUMENTS

| | | | | |
|---|---|---|---|---|
| 3,631,979 | A * | 1/1972 | Frankiewicz et al. | 209/554 |
| 4,634,881 | A * | 1/1987 | Billion | B07C 5/342 |
| | | | | 209/585 |
| 5,311,999 | A * | 5/1994 | Malow | B07C 3/14 |
| | | | | 209/583 |
| 5,762,431 | A | 6/1998 | Pawelka et al. | |
| 5,886,726 | A | 3/1999 | Pawelka et al. | |
| 6,257,783 | B1 * | 7/2001 | Hanaoka | H04N 1/00572 |
| | | | | 400/188 |
| 6,279,901 | B1 | 8/2001 | Fulmer | |
| 6,308,886 | B1 * | 10/2001 | Benson | G06K 17/00 |
| | | | | 235/375 |
| 6,318,914 | B1 | 11/2001 | Cuo et al. | |
| 7,301,115 | B2 * | 11/2007 | Elliot | G07B 17/00362 |
| | | | | 209/584 |
| 7,398,972 | B2 | 7/2008 | Schuller et al. | |
| 7,416,179 | B2 * | 8/2008 | Jones et al. | 271/65 |
| 7,434,728 | B2 | 10/2008 | Paulson et al. | |
| 2001/0019340 | A1 * | 9/2001 | Kubo | B41J 2/01 |
| | | | | 347/1 |
| 2002/0006298 | A1 * | 1/2002 | Morozumi | G06K 1/121 |
| | | | | 400/61 |
| 2002/0150288 | A1 * | 10/2002 | Fujiwara | G06T 17/10 |
| | | | | 382/154 |
| 2003/0152409 | A1 * | 8/2003 | Pribula et al. | 400/718 |
| 2005/0053406 | A1 | 3/2005 | Jones et al. | |
| 2005/0104281 | A1 * | 5/2005 | Stender | B41J 3/60 |
| | | | | 271/185 |
| 2006/0148213 | A1 * | 7/2006 | Iwamura | G02F 1/133351 |
| | | | | 438/463 |
| 2008/0112610 | A1 * | 5/2008 | Israelsen | G06T 17/00 |
| | | | | 382/154 |
| 2010/0284609 | A1 * | 11/2010 | Ding | G06T 7/602 |
| | | | | 382/154 |
| 2011/0185930 | A1 * | 8/2011 | Van Der Avoort et al. | |
| | | | | 101/407.1 |
| 2011/0217109 | A1 | 9/2011 | Cronin et al. | |

OTHER PUBLICATIONS

Written Opinion for international application No. PCT/US2013/027253, dated May 27, 2013 (9 pages).
Extended European Search Report issued in the corresponding European Patent Application No. 13 751 868.4, dated Oct. 23, 2015, 4 pages.

* cited by examiner

CARD REORIENTING MECHANISM AND METHODS UTILIZING SAME

FIELD

This disclosure relates to plastic card processing equipment, particularly desktop processing equipment, that perform at least one processing operation on a plastic card, such as a credit card, driver's license, identification card and the like. More particularly, this disclosure relates to a mechanism for reorienting a plastic card within card processing equipment.

BACKGROUND

The use of card processing equipment for processing plastic cards is known. In such equipment, a plastic card to be processed is input into the processing equipment, at least one processing operation is performed on the input card, and the card is then output from the processing equipment. The processing operation(s) performed on the plastic card by known processing equipment includes one or more of printing, laminating, magnetic stripe encoding, programming of a chip embedded in the card, and the like.

The processing equipment is often configured in the form of a desktop unit which, to limit the size of the unit, typically perform only one processing operation on the plastic card, although the equipment may perform multiple card processing operations. An example of a popular desktop plastic card processing unit is a desktop plastic card printer which performs monochromatic or multi-color printing on a card that is input into the printer.

SUMMARY

Systems and methods that utilize a card reorienting mechanism are described. Generally, the card reorienting mechanism can transport and rotate a card without contacting either of the principal surfaces of the card. The term "principal surface of the card" means the surface on which an operation such as printing, laminating, magnetic strip encoding, contact programming a chip embedded in the card, image capturing and other operations are performed that require direct access to some or all of the principal surface. For example, a typical credit card has two principal surfaces, the front and back principal surfaces, where the front principal surface has the credit card number imprinted on it, and the back principal surface has a signature block for the owner of the credit card. The principal surface of the card is distinguishable from the side surface or edge of the card. The term "side surface" means the surface along the thickness of the card, i.e. the edges. For example, a typical credit card has four side surfaces or edges.

The use of the card reorienting mechanism with, for example, a card printing machine permits reorienting of the card without contacting the principal surfaces of the card after an operation has been performed on one of the principal surfaces of the card. The card reorienting mechanism of the present disclosure can be useful, for example, where rotation of the card is desired moments after ink has been applied to one of the principal surfaces of the card.

That is, previously disclosed card reorienting mechanisms have involved contacting one or both of the principal surfaces of the card with rollers when rotating the card. However, curing of ink typically is not instantaneous, and as such, contacting the principal surface of the card after ink has been applied can lead to the ink being pulled off the principal surface of the card or smeared. By using a card reorienting mechanism that does not contact the principal surfaces of the card, the card can be rotated without impacting personalization or other printing that has been applied to one or more of the principle surfaces.

In addition, previously disclosed reorienting mechanisms involve the use of components that can obstruct the full view of the principal surface of the card. The card reorienting mechanism of the present disclosure can permit complete access to one of the principle surfaces while in the card reorienting mechanism, thereby allowing processing operations to be performed on the card while the card is held in the card reorienting mechanism.

In general, the card orienting mechanism can include first and second electric motors and a card reorienting device. The card reorienting device can include a platform and a transport device that can grip a side surface of the card. The rotation of the platform can be actuated by the first electric motor while the transport device can be actuated by the second electric motor.

In an embodiment, the transport device includes a roller that is configured so that the roller can engage a side surface of the card, transport the card across the platform and hold the card while the card is being reoriented.

In an embodiment, the transport device includes a belt that is moved by a drive roller and supported by idler rollers. The belt can be configured so that the belt can engage a side surface of the card, transport the card across the platform and hold the card while the card is being reoriented.

In an embodiment of the method, the method involves transportation and rotation of a card in the card reorienting mechanism without contacting the principal surface of the card.

In an embodiment of the method, the method involves reorienting the card at an angle suitable for image capturing without obstructing a full view of the principal surface of the card such that an image of the entire principal surface can be captured while the card is on the card reorienting device.

DRAWINGS

DETAILED DESCRIPTION

This disclosure relates to card processing equipment for processing data bearing cards, such as credit cards, driver's licenses, identification cards, gift cards, loyalty cards and the like. A specific implementation of the concepts of the card processing equipment will be described in detail with respect to a substrate that is made of plastic and typically has a size that can, for example, fit in a wallet, such as a credit card, and the substrate will be referred to as a plastic card. However, the concepts described herein could be implemented in equipment for processing other types of substrates, where the substrates to be processed can have any size that is suitable for use in substrate processing equipment.

Further, the specific implementation of the concepts of the card processing equipment will be described in detail with respect to a desktop plastic card printer that performs printing, either monochromatic or multi-color, on plastic cards. Printing can be performed using inks and/or dyes and/or using a laser to laser engrave data on the card. However, the concepts described herein also could be implemented on other types of plastic card processing equipment that perform other types of card processing functions either in addition to, or separate from, printing. Other card processing operations include laminating one or more sides of a card, encoding a magnetic stripe on the card, programming a chip embedded in the card, embossing and other types of card processing known in the art. In addition, the card processing equipment can be central issuance equipment, for example a module used with other modules in central issuance equipment.

Figure 1:
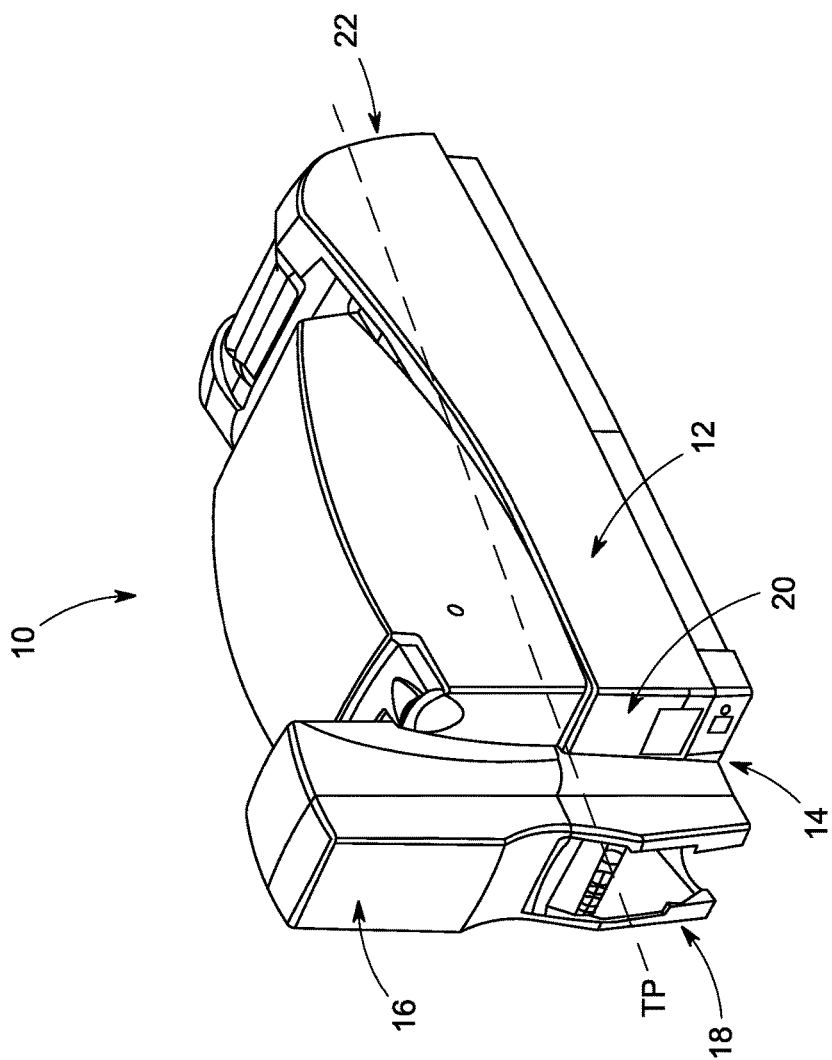
FIG. 1 is a perspective view of a desktop plastic card printer employing a card reorienting mechanism described in this patent application.

With reference to FIG. 1, a desktop plastic card printer 10 is illustrated. The printer 10 includes a housing 12 having an input/output end 14 with an input hopper assembly 16 adjacent the input/output end 14 for feeding cards into the printer to be printed by a print mechanism (not shown) within the printer 10, and an output hopper assembly 18 for receiving printed cards from the printer. The print mechanism can be, for example, a thermal print mechanism. A suitable thermal print mechanism is disclosed, for example, in U.S. Pat. Nos. 5,762,431, 5,886,726 and 7,434,728 each of which is incorporated herein by reference.

For convenience in describing the figures, the input/output end 14 of the printer will be described as being at a front end region 20 of the housing 12 while the opposite end of the housing 12 will be referred to as a back end region 22. The printer 10 depicted in FIG. 1 illustrates the input and output at the same end of the printer. However, the printer 10 can have the input and the output at opposite ends of the printer 10 or at any suitable locations on the printer. For example, the input can be at the front end region 20 and the output can be at the back end region 22. In another example, each of the input and output can be in separate modules.

As described in more detail in U.S. Pat. Nos. 5,762,431 and 5,886,726, in operation of the printer, a card is fed from the input hopper assembly 16 into the printer 10. The card is transported via suitable transport devices to the print mechanism which, for example, performs a desired printing operation on one principle surface of the card and/or performs any other processing operations. After printing is complete, the printed card is transported back to the input/output end 14 where the card is deposited into the output hopper assembly.

The printers disclosed in U.S. Pat. Nos. 5,762,431 and 5,886,726 have one processing level and are configured to print on only one principle surface of the card. One way to print on the opposite principle surface of the card for these printers is to manually re-feed the card back into the printer after the printing is complete on one principle surface of the card. Another way to print on the opposite principle surface of the card is to provide a card reorienting mechanism within the printer that automatically flips the card 180 degrees after printing is completed on one principle surface of the card. In one instance, after the card is flipped, it is then transported back to the print mechanism to print on the opposite principle surface of the card. In another instance, after the card is flipped, printing, such as laser personalization, on the opposite principle surface of the card is performed while the card is on the card reorienting mechanism.

Figure 2:
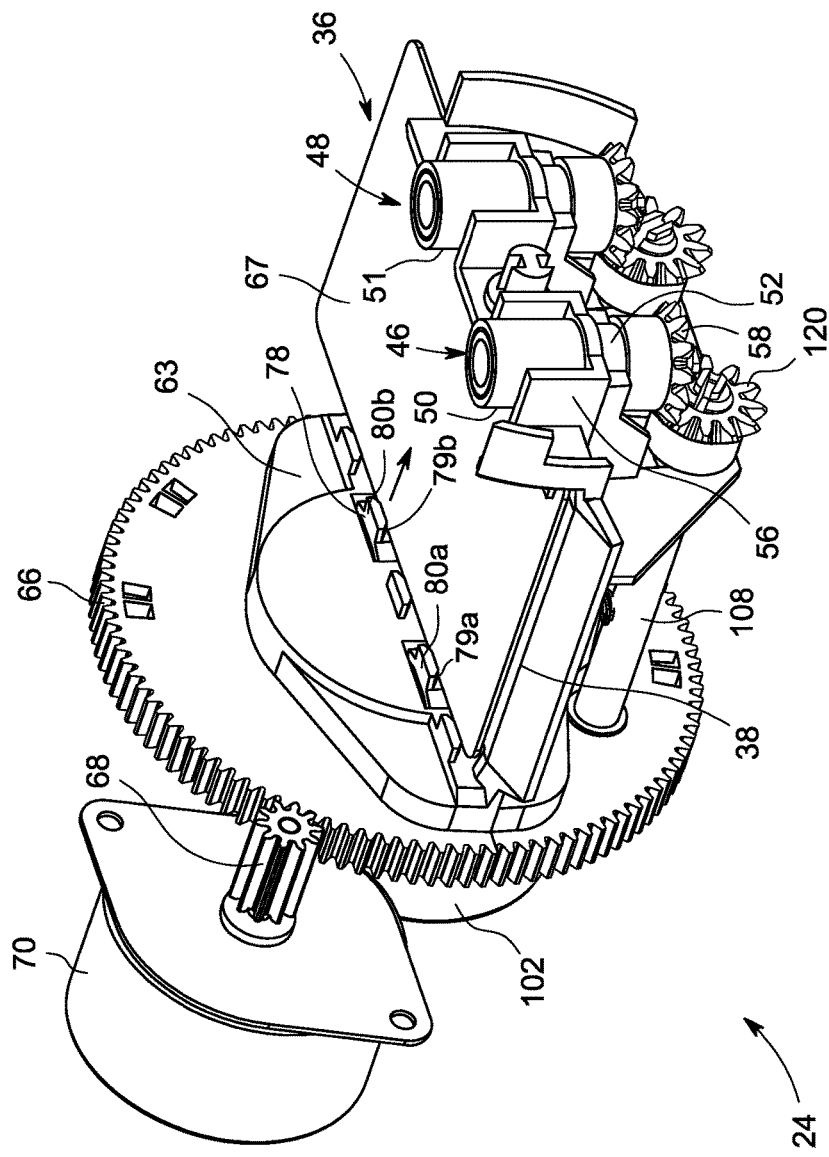
FIG. 2 is a perspective view of one embodiment of a card reorienting mechanism that can be included in the printer shown in FIG. 1.

Referring to FIGS. 1 and 2, the printer 10 is configured to have a card orienting mechanism 24 to permit printing on opposite principle surfaces of the card. The card orienting mechanism 24 can be positioned anywhere that is suitable in the printer 10 for reorienting the card, including at the middle or back end region of the housing 12. The card orienting mechanism 24 is designed to flip a card 180 degrees after one principal surface of the card is printed to enable the opposite principal surface of the card to be printed. In addition to flipping a card 180 degrees, the card orienting mechanism 24 is able to reposition the card at any angle relative to the primary card travel path through the printer 10. A portion of the travel path through the printer is indicated by the line TP in FIG. 1. Hereinafter, the mechanism 24 will be described as a reorienting mechanism which encompasses reorienting a card 180 degrees, as well as reorienting the card to any angle relative to the card travel path.

In another instance, the printer 10 may include multiple card processing levels as disclosed in U.S. Pat. No. 7,434,728. The multiple card processing levels generally include vertically separated levels, where a card can travel initially along an upper card processing level and thereafter be transported downward to a lower card process level. One way to print on the opposite side of the card for this type of printer is to provide a card reorienting mechanism 24 at the back end region of each of the levels. In one example, the card can travel in a horizontal orientation from the front to the back end on an upper level with the front principal surface facing upward. When reaching the back end of the upper level, the card can then be fed into an upper card orienting mechanism, rotated to a vertical orientation so that the card points downward toward a lower card reorienting mechanism, fed into the lower card reorienting mechanism, and then rotated back to the horizontal orientation so that the back principal surface of the card faces upward.

Figure 3:
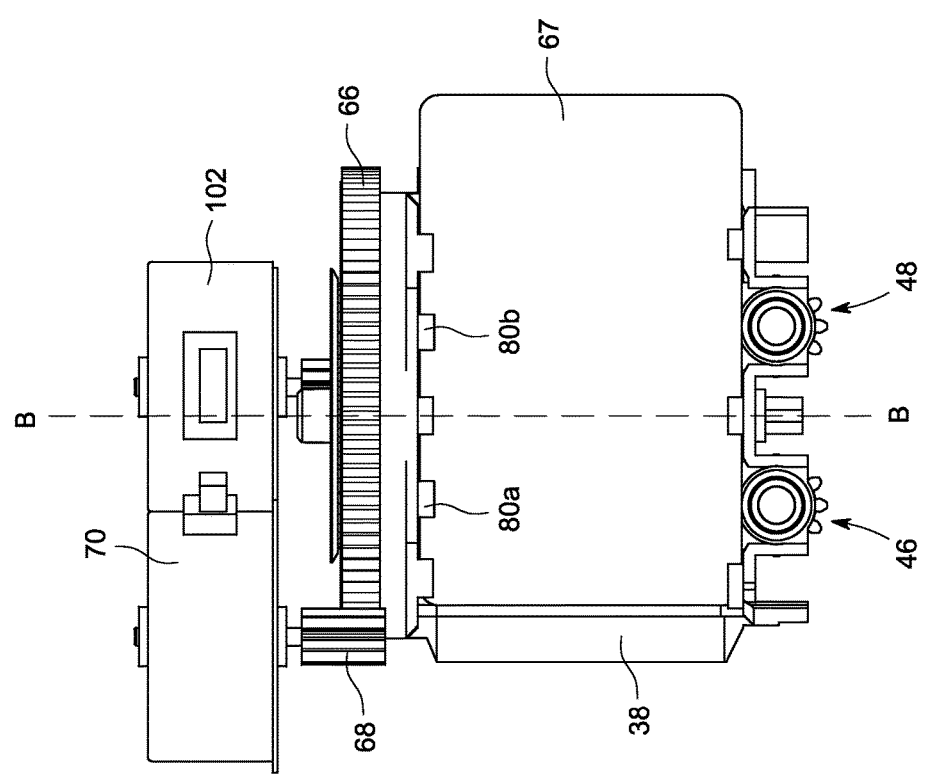
FIG. 3 is a top view of the card reorienting mechanism shown in FIG. 2.

Details of the mechanism 24 will now be described with reference to FIGS. 2-5. The mechanism 24 includes a card reorienting device 36 which is configured to receive a card to be reoriented and reorient the card. The card reorienting device 36 comprises a platform 38 having an upper surface and an opposite lower surface. FIGS. 2-5 show a plastic card 67 lying flat on the upper surface of the platform 38 so that one of the principal surfaces of the plastic card faces downward, and the other principal surface is in substantially full view as viewed from a top plan view as shown in FIG. 3.

The platform 38 is fixed to a fixing member 63. As shown in FIG. 2, one of the sides of the platform 38 is attached to the fixing member 63, while the fixing member 63 is fixed to a gear 66 so that the platform 38 rotates with the gear 66. The fixing member 63 includes a biasing member 78 for biasing the card 67. The biasing member 78 will be discussed in more detail below.

The gear 66 forms part of a drive train to cause rotation of the platform 38 about the axis B-B shown in FIG. 3. The drive train also includes a drive pinion 68 that is engaged with the gear 66 and that is driven by a first electric stepper motor 70.

In use, when the drive pinion 68 is rotated, the gear 66 is driven so that the platform 38 rotates about the axis B-B. The drive pinion 68 can be rotated in either direction to cause rotation of the gear 66 and the platform 38 in either direction.

The card reorienting device 36 further comprises a pair of card transport devices 46, 48 for transporting a card onto the platform 38, holding the card while the device 36 reorients the card, and then transporting the card from the card orienting device 36. The transport devices 46, 48 are provided on the side of the platform that is opposite to the side of attachment of the platform 38 to the fixing member 63, but they could be on the opposite side from that shown. The transport devices 46, 48 are identical to each other and only the transport device 46 will be described in detail. It is to be understood that the transport device 48 operates identically to the transport device 46.

The transport device 46 comprises a roller 50 that is fixed on a shaft 52 that is rotatably supported in a support member 56. The shaft 52 and the roller 50 are positioned such that the axis of the shaft 52 is substantially orthogonal to the principal surface of the card 67 facing upward as shown in FIG. 2. The roller 50 can be formed of any material that is suitable for gripping a side surface of the card 67, including, but not limited to, rubber, rubber-like material, grit-like surfaces, and other high friction surfaces.

Details of a drive train that causes rotation of the roller 50 about the axis of the shaft 52 will now be described with reference to FIG. 5. Included in the drive train are a second electric stepper motor 102, a drive pinion 104 that is driven by the stepper motor 102, a sun gear 106 that is engaged with the drive pinion 104, a shaft 108 having a pinion gear 110 fixed on one end and another pinion gear 120 fixed on the opposite end of the shaft 108, and a pinion gear 58 that is fixed to the end of the shaft 52. The pinion gear 110 engages with the sun gear 106 and the pinion gear 120 engages with the pinion gear 58 that is fixed to the shaft 52.

Figure 4:
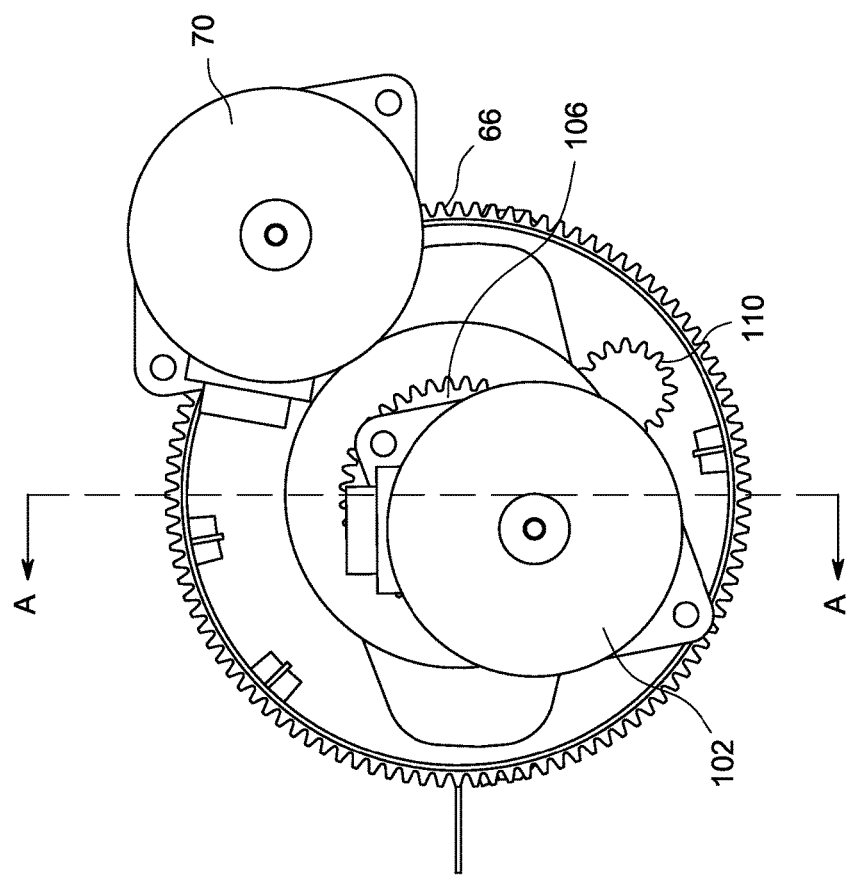
FIG. 4 is a side view of the card reorienting mechanism shown in FIG. 2.
Figure 5:
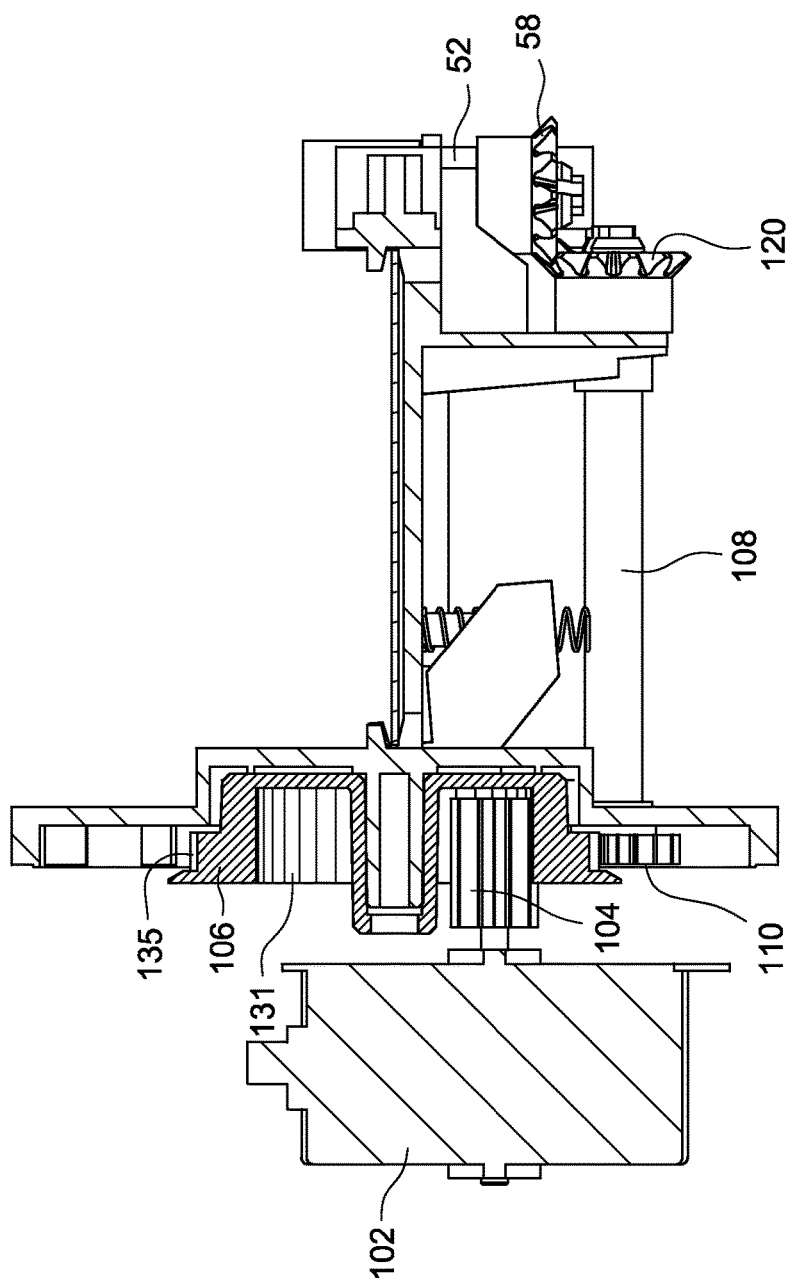
FIG. 5 is a cross-sectional side view taken along axis A-A of the card reorienting mechanism shown in FIG. 4.

Referring to FIGS. 4 and 5, the sun gear 106 has internal teeth 131 that engage with the drive pinion 104 and external teeth 135 that engage with the pinion gear 110. In use, when the drive pinion 104 is rotated, the sun gear 106 is driven which in turn rotates the pinion gear 110 and the pinion gear 120. This causes the pinion gear 58 to rotate, which causes rotation of the roller 50 that is fixed on the shaft 52.

Referring to FIG. 2, the biasing member 78 included in the fixing member 63 has surfaces 79a, 79b that guide the card 67 along the platform 38 and that bias the card 67 in the direction toward the transport devices 46 and 48 as indicated by the arrow in FIG. 2 by engaging a side surface of the card 67. Any biasing mechanism suitable for providing a biasing force sufficient to maintain adequate engagement forces between the transport devices 46, 48 (also known as transport mechanisms), the biasing member 78 and side surfaces of the card 67 can be used. In one example, a coil spring can be used for the biasing mechanism.

The biasing member 78 also includes overhang sections 80a, 80b that extend from the surfaces 79a, 79b and that overhang a portion of the principle surface of the card that, together with other overhanging sections extending from the fixing member, create a track for the card and to prevent the card from falling out of the mechanism while the card is being transported or reoriented. Similar overhanging sections are shown in FIG. 3 overhanging the principle surface along the other longitudinal edge of the card to create a track for the other edge of the card. Other card track constructions can be used to guide the card and prevent the card from falling out. Therefore, a small portion of the upper principle surface of the card along each longitudinal edge will be overhung and therefore blocked, i.e. not visible or not accessible for processing operations, as shown in FIG. 3. The blocking by the card track is minimal and limited to relatively insignificant portions of the principle surface along its longitudinal edges. So as shown in FIG. 3, despite the minimal blocking by the overhanging sections, the principal surface is in substantially full view which permits substantially complete access to the principle surface for processing operations.

In use, when the card 67 is to be brought onto the platform 38 or driven from the platform 38, the second stepper motor 102 drives the drive train as indicated above to rotate the roller 50 of the transport device 46. At the same time, the second stepper motor 102 also rotates a roller 51 of the transport device 48 utilizing a similar drive train as described above for the transport device 46 so that the rollers 50 and 51 are rotated in the same direction. The biasing member 78 provides a biasing force sufficient to maintain sufficient contact forces between the rollers 50, 51, the biasing member 78 and side surfaces of the card 67 for bringing the card 67 onto the platform 38 or to drive the card 67 from the platform 38.

FIGS. 2-5 illustrate the card reorienting mechanism 24 as having two transport devices 46, 48. However, the number of transport devices utilized can be any number suitable for bringing the card 67 onto the platform 38, holding the card 67 while the platform 38 rotates and driving the card 67 from the platform 38. In one example, the number of transport devices utilized is such that at least one roller is in contact with the card 67 when the card 67 is brought onto the platform 38 and driven from the platform 38. In one example, the number of transport devices can be one or more than two.

Further, the mechanism 24 is illustrated as having the transport devices 46, 48 being situated on the side opposite of the gear 66. However, it is to be appreciated that one or more of the transport devices can be provided on the side of the gear 66 instead of the biasing member 78. In this instance, a similar transport device(s) as that of transport devices 46, 48 can be provided on the side of the gear 66, for example, on the fixing member 63.

In another instance, a similar transport device(s) as that of transport devices 46, 48 can be provided on the gear 66 instead of the biasing member 78, and a biasing member similar to that of the biasing member 78 can be provided on the side opposite of the gear 66 instead of the transport devices 46, 48.

In yet another instance, the biasing member 78 can be replaced with idler rollers.

Details of another embodiment of a card reorienting mechanism will now be described with reference to FIGS. 6 and 7. The card reorienting mechanism illustrated in FIGS. 6 and 7 is generally similar to the card reorienting mechanism illustrated in FIGS. 2-5 except that the transport device utilized is different.

Figure 6:
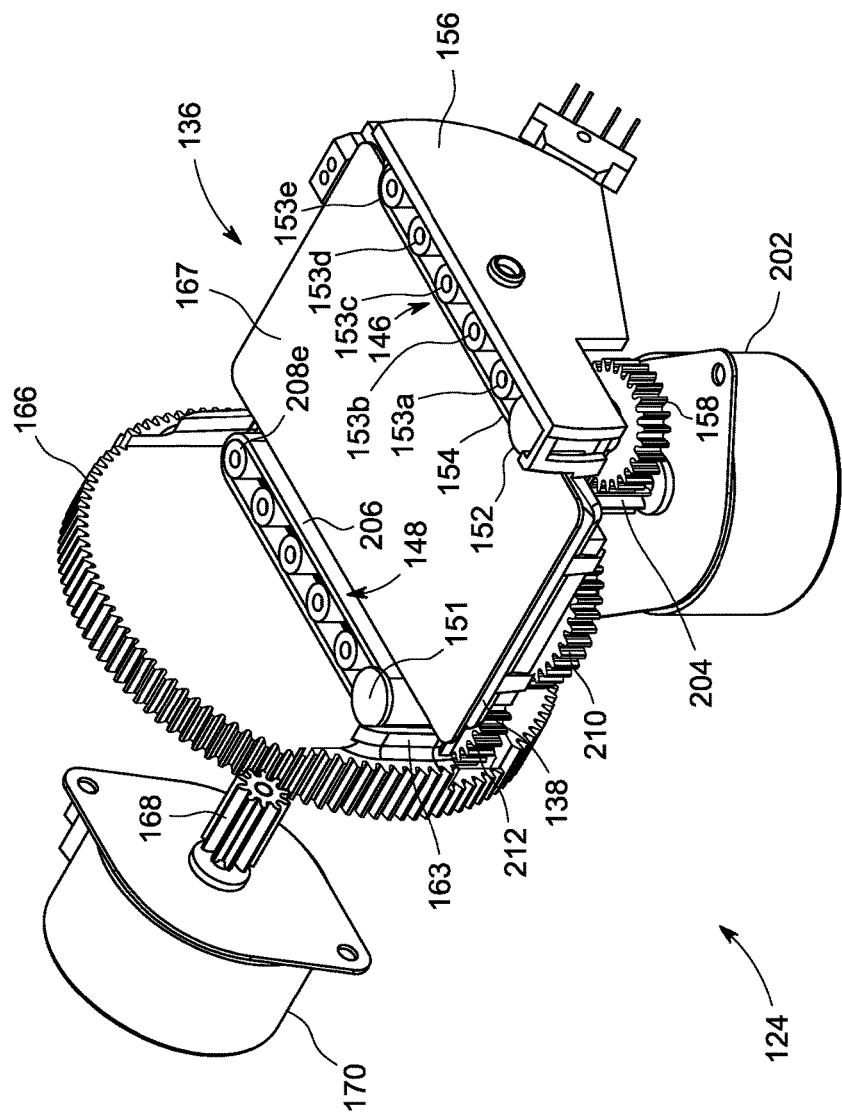
FIG. 6 is a perspective view of another embodiment of a card reorienting mechanism that can be included in the printer shown in FIG. 1.
Figure 7:
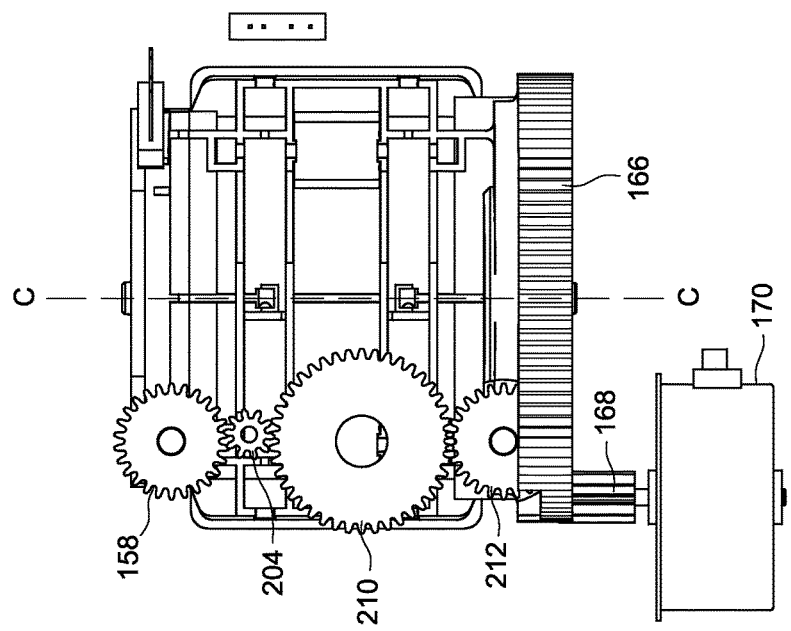
FIG. 7 is a bottom view of the card reorienting mechanism shown in FIG. 6.

With reference to FIG. 6, a card reorienting mechanism 124 includes a card reorienting device 136 which is configured to receiving a card to be reoriented and reorienting the card. The card reorienting device 136 comprises a platform 138 having an upper surface and an opposite lower surface. FIG. 6 shows a plastic card 167 lying flat on the upper surface of the platform 138 so that one of the principal surfaces of the plastic card faces downward, and the other principal surface is in substantially full view similar to the top plan view as shown in FIG. 3.

The platform 138 is fixed to a fixing member 163 while the fixing member 163 is fixed to a gear 166 so that the platform 138 rotates with the gear 166. The gear 166 forms part of a drive train to cause rotation of the platform 138 about the axis C-C shown in FIG. 7. The drive train also includes a drive pinion 168 that is engaged with the gear 166 and that is driven by a first electric stepper motor 170.

In use, when the drive pinion 168 is rotated, the gear 166 is driven so that the platform 138 rotates about the axis C-C. The drive pinion 168 can be rotated in either direction to cause rotation of the gear 166 and the platform 138 in either direction.

The card reorienting device 136 further comprises a pair of card transport devices 146, 148 for transporting a card onto the platform 138, holding the card while the device 136 reorients the card, and then transporting the card from the card orienting device 136. The transport devices 146, 148 are provided on each side of the platform 138. The transport devices 146, 148 are identical to each other and only the transport device 146 will be described in detail. It is to be understood that the transport device 148 operates identically to the transport device 146.

The transport device 146 comprises a drive roller 152, five idler rollers 153a-e, and a belt 154 that is stretched over the drive roller 152 and the idler rollers 153a-e. The drive roller 152 and the idler rollers 153a-e are positioned such that the drive roller 152 and the idler rollers 153a-e are aligned in a linear fashion and the rotational axis of each of the drive roller 152 and the idler rollers 153a-e is substantially orthogonal to the principal surface of the card 167 as shown in FIG. 6.

The drive roller 152 and the idler roller 153a-e are rotatably supported in a support member 156. The drive roller 152 and the belt 154 can be formed of a rubber, rubber-like, or other material to permit the drive roller 152 to grip the belt 154 so that when the drive roller 152 is rotated, the belt 154 moves in a linear fashion along the drive roller 152 and the tail roller 153e.

With reference to FIG. 6, a pinion gear 158 is fixed to the end of the drive roller 152. The pinion gear 158 is part of a drive train to cause rotation of the roller 152. Included in the drive train is a drive pinion 204 that is engaged with the pinion gear 158 and that is driven by a second stepper motor 202.

Details of a drive train that causes rotation of a roller 151 of the transport device 148 will now be described. The drive roller 151 moves a belt 206 similarly to the transport device 146 described above. A pinion gear 212 is fixed to the end of the drive roller 151 and is part of a drive train to cause rotation of the roller 151. Included in the drive train is the drive pinion 204 that is driven by the second stepper motor 202, and a gear 210 that is engaged with the drive pinion 204 and also with the pinion gear 212.

During operation, when the drive pinion 204 is rotated, the gear 158 is driven which in turn rotates the drive roller 152. Rotation of the drive pinion 204 also causes the gear 210 to rotate, which in turn drives the pinion gear 212 so that the drive roller 151 is rotated. Rotation of the drive roller 152 causes the belt 154 to move in a linear fashion between the drive roller 152 and the tail roller 153e, and rotation of the drive roller 151 causes the belt 206 to move in a linear fashion between the drive roller 151 and a tail roller 208e.

The rubber, rubber-like or other friction material of the belts 154, 206 permits the belts 154, 206 to grip the side surfaces of the card 167. Also, the transport devices 146, 148 can be spaced so that sufficient contact forces can be maintained between the belts 154, 206 and the side surfaces of the card for bringing the card 167 onto the platform 138 and to drive the card 167 from the platform 138.

The card reorienting mechanism 124 is illustrated as having the transport device 146 being situated on one side of the platform 138 and the transport device 148 being situated on the other side of the platform 138. However, one of the transport devices 146, 148, can be replaced, for example, with idler rollers or other suitable non-driven guide mechanism. In the instance where the transport device 148 is replaced with a non-driven card guide mechanism, the transport device 146 and the card guide can likewise be spaced so that sufficient contact forces can be maintained between the belt 154 and the card guide and the side surfaces of the card 167 for bringing the card 167 onto the platform 138 and to drive the card 167 from the platform 138.

Moreover, each of the transport devices 146, 148 are illustrated as having one drive roller and five idler rollers. However, the number of drive rollers and idler rollers utilized can be any number suitable for moving the belts 154, 206 in a linear fashion between the head and tail rollers.

In addition, although not illustrated in FIG. 6, suitable card tracks would be provided to guide the longitudinal edges of the card and prevent the card from falling off the reorienting mechanism. For example, caps can be provided on top of the drive rollers 151, 152 and/or on top of the idler rollers 153a-e which slightly overhang the surface of the card similar to the overhanging sections 80a, 80b.

Details of a method of reorienting the card will now be described. In an embodiment, the method includes reorienting the card without contacting a principal surface of the card. The method of reorienting the card can be part of a method of printing. That is, the method can include printing on a principal surface of the card, and then reorienting the card without contacting the principal surface of the card on which printing has been performed.

In one example, the method of reorienting the card further includes transporting a card without contacting the principal surface of the card. In one instance, the card is transported and reoriented by gripping the side surfaces of the card. In one implementation, the method of reorienting the card involves the use of the transport devices described above. For example, the method of reorienting the card can involve the use of the transport devices 46, 48 or the use of the transport devices 146, 148.

Details of a method of capturing an image of a card will now be described. In some instances, an image capturing device can be provided in the printer 10 to capture an image of the principal surface of the card. Such image capturing devices can be helpful in detecting errors and the like after printing on the principal surface of the card. In general, due to the optical properties of image capturing devices, only cards provided at a certain angle relative to the optical axis of the image capturing device will be reproduced clearly.

Figure 8:
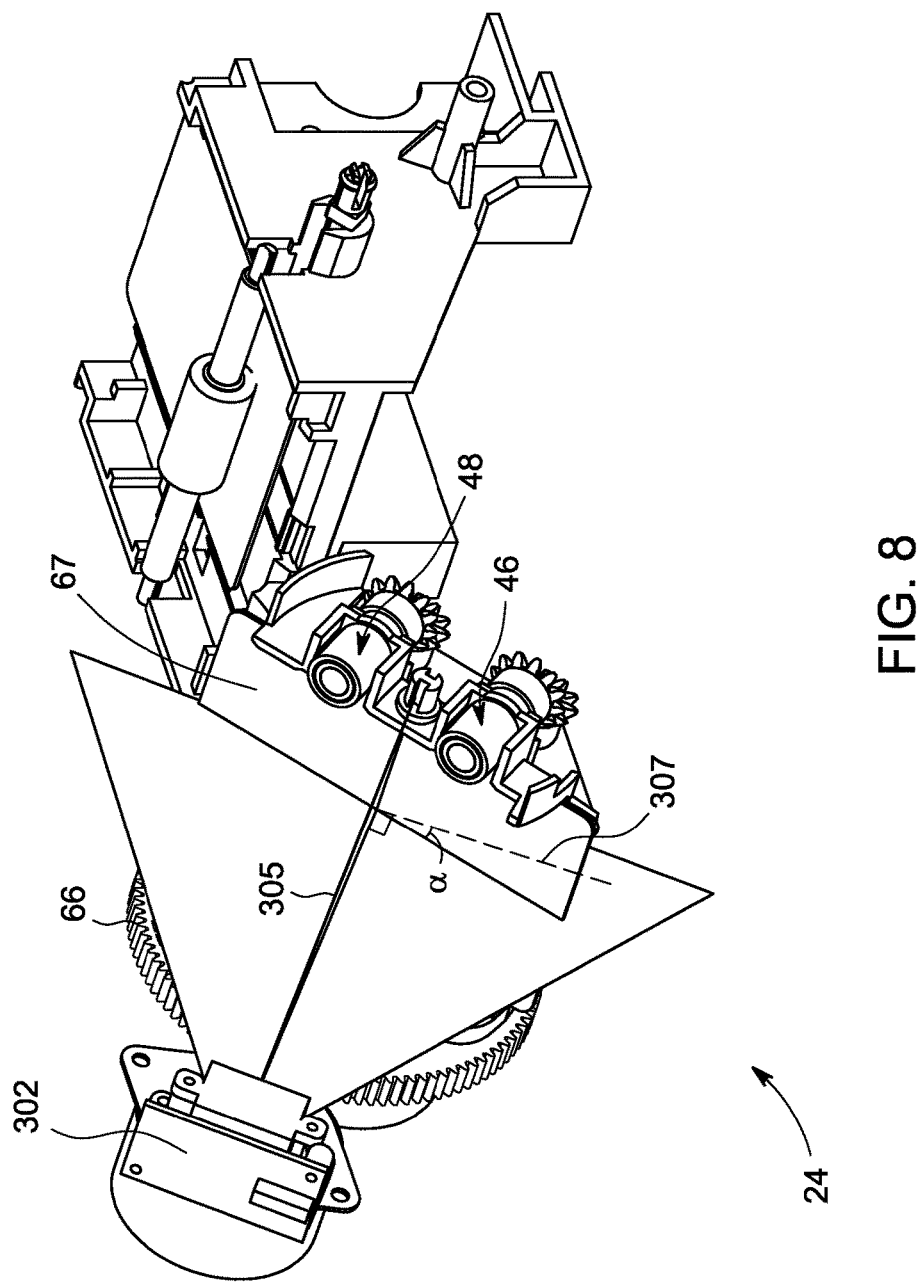
FIG. 8 is a perspective view of an image capturing device and the card reorienting mechanism shown in FIG. 2.

FIG. 8 shows an embodiment of the printer 10 that includes an image capturing device 302 and the card orienting mechanism 24, where the card orienting mechanism 24 orients the card 67 at a position that is suitable for clearly reproducing an image of the principal surface of the card 67. The image capturing device 302 has an optical axis 305. The card 67 is oriented on the platform 38 of the card orienting mechanism 24 such that the principal surface of the card 67 is at a non-perpendicular angle α relative to the normal of the optical axis 305 (normal of the optical axis 305 is shown by dashed line 307 in FIG. 8).

In an embodiment, the method includes reorienting the principal surface of the card before capturing an image of the principal surface of the card. The image capture can occur on a pre-personalized card (i.e. before personalization occurs) and/or after some or all of the intended personalization has occurred.

In an embodiment, the method includes reorienting the principal surface of the card to an angle α relative to the normal of the optical axis 305 of the image capturing device 302. In one instance, the angle α is more than 0°, alternately in a range of more than 0° and less than 90°, alternately about 15° to about 30°. Examples of the image capturing device can include a scanner and a camera.

As is apparent from the foregoing description, one of the design advantages of the card reorienting mechanism is that a plastic card can be transported and reoriented without contacting the principal surface of the card. This feature permits, for example, substantially full view of the principal surface of the card as illustrated in FIG. 3. Having substantially full view of the principal surface of the card can be useful, for example, when performing laser personalization on the surface of the card while it is being held in the card reorienting mechanism and/or obtaining an image capture of substantially the entire principal surface of the card while the card is in the card reorienting mechanism.

Advantages of this feature also can be realized when printing a full card bar code, for optical character recognition (OCR), for print verification and for laser personalization.

Further, as discussed above, the card reorienting mechanism of the present disclosure can be useful, for example, where rotation of the card is desired moments after ink is applied to one of the principal surfaces of the card.

Any combination of the embodiments described herein, including utilization of any combination of transport devices, can be used and are intended to be included in this patent application.

The embodiments disclosed in this application are to be considered in all respects as illustrative and not limitative. The scope of the claims is indicated by the appended claims rather than by the foregoing description; and all changes which come within the meaning and range of equivalency of the claims are intended to be embraced therein.

The invention claimed is:

1. A method of transporting a card onto or from a card reorienting mechanism in a card processing machine, the card having a principle surface, comprising:

transporting the card onto and from the card reorienting mechanism using a card transport device that contacts a side surface of the card without contacting the principal surface of the card.

2. The method of claim 1, further comprising:

with the card on the card reorienting mechanism, rotating the card reorienting mechanism so as to reorient the card without contacting the principal surface of the card.

3. The method of claim 1, further comprising processing the principal surface of the card while the card is on the card reorienting mechanism.

4. A card reorienting mechanism of a card processing machine, comprising:

a rotatable platform having an upper surface on which a plastic card can lay flat;

at least one actuatable card transport device mounted on the rotatable platform and rotatable therewith, the at least one actuatable card transport device is configured to drivingly engage a side edge of the plastic card without drivingly engaging a principal surface of the plastic card; and an electric motor in driving engagement with the at least one actuatable card transport device to actuate the at least one actuatable card transport device.

5. The card reorienting mechanism of claim 4, wherein the at least one actuatable card transport device includes a rotatable roller.

6. The card reorienting mechanism of claim 4, wherein the at least one actuatable card transport device includes at least two rotatable rollers.

7. The card reorienting mechanism of claim 4, wherein the at least one actuatable card transport device includes a drive roller, an idler roller, and a belt that is supported by the drive roller and the idler roller.

8. The card reorienting mechanism of claim 4, comprising two of the actuatable card transport devices, wherein each one of the actuatable card transport devices includes a drive roller, an idler roller, and a belt that is supported by the drive roller and the idler roller.

9. The card reorienting mechanism of claim 8, wherein the two actuatable card transport devices are disposed at opposite sides of the rotatable platform.

* * * * *